UNITED STATES PATENT OFFICE.

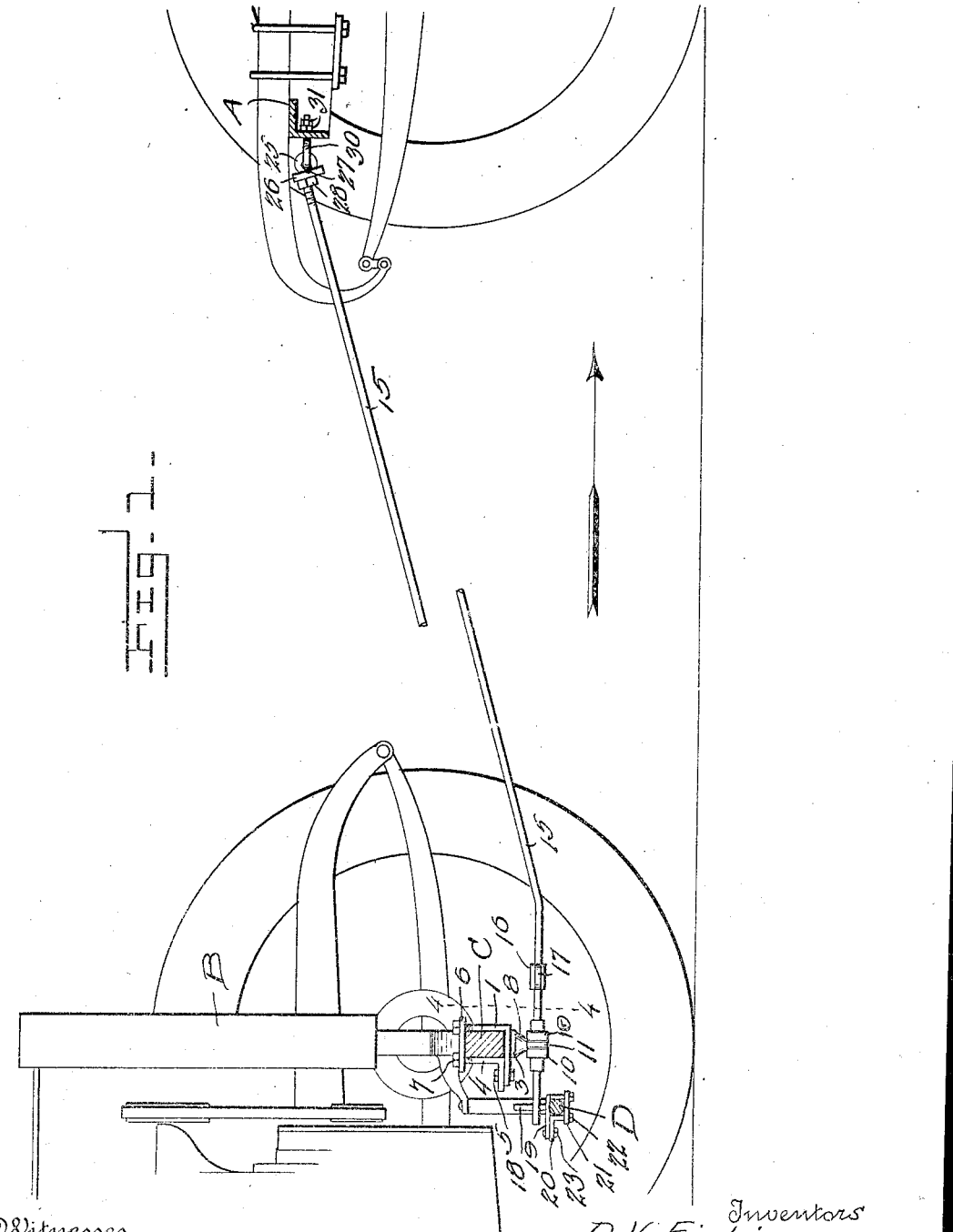

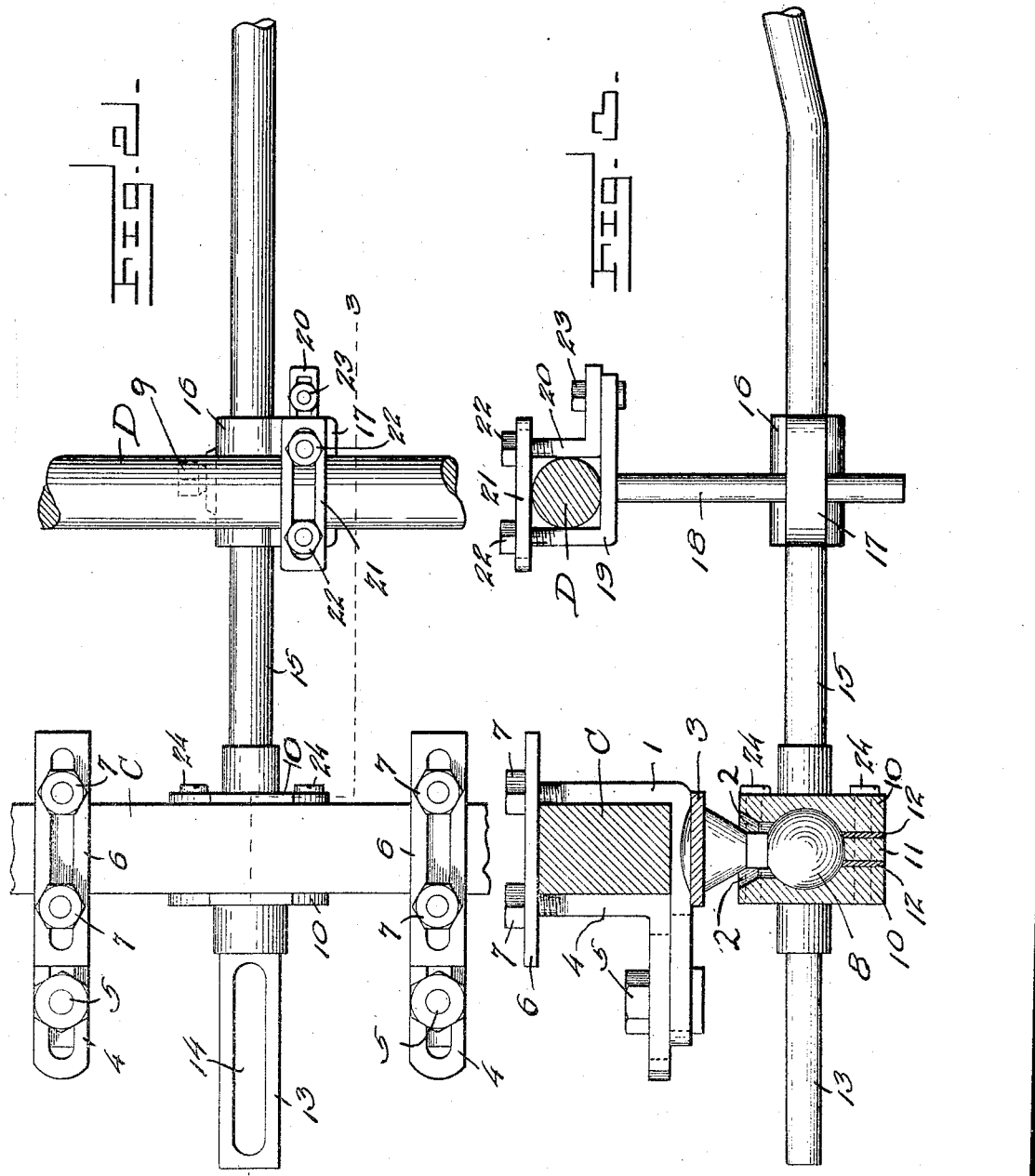

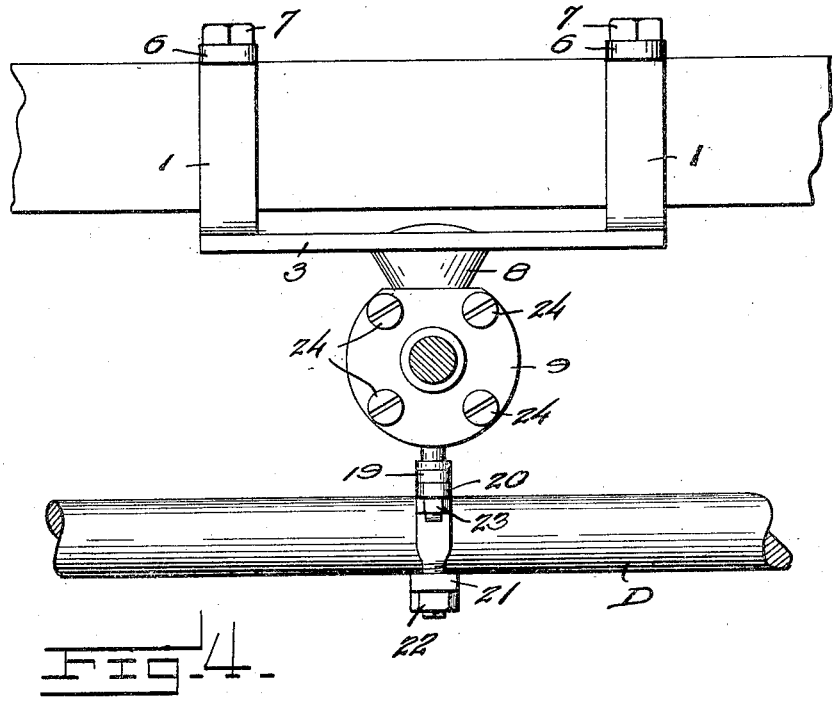
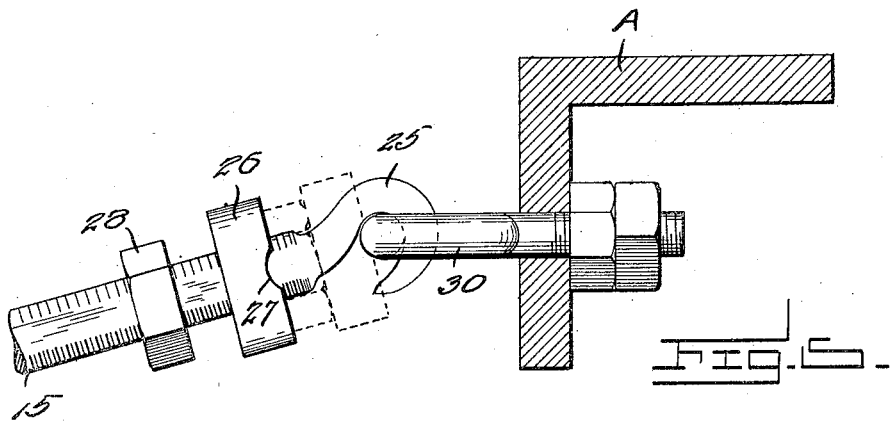

DONALD V. EICHIN, EDWARD F. ZIMMERLY, AND AARON H. ZIMMERLY, OF OLNEY, ILLINOIS.

TOWING DEVICE FOR AUTOMOBILES.

1,123,262.     Specification of Letters Patent.     Patented Jan. 5, 1915.

Application filed April 7, 1914.   Serial No. 830,132.

*To all whom it may concern:*

Be it known that we, DONALD V. EICHIN, EDWARD F. ZIMMERLY, and AARON H. ZIMMERLY, citizens of the United States, residing at Olney, in the county of Richland and State of Illinois, have jointly invented a new and useful Towing Device for Automobiles, of which the following is a specification.

Our invention relates to an improved towing device for automobiles, our object being to do away with the use of ropes and cables; to provide a device that will automatically steer the rear automobile; to provide a device that may be readily attached and detached and which may be applied to any type of automobile, whether the steering mechanism of the rear automobile be disposed in the rear of or forward of the front axle; and to provide an improved construction and combination of parts, and with other objects as hereinafter disclosed in the description and claims and in the accompanying illustrations of our invention.

We attain these objects by the mechanism illustrated in the accompanying drawings, in which—

Figure 1 is a side elevation of our device applied to two automobiles; Fig. 2 is a top plan view of our towing device, as applied to an automobile having rod D located in front of instead of in the rear of axle C as in Fig. 1; Fig. 3 is a cross section taken approximately on line 3—3 of Fig. 2; Fig. 4 is a view taken on line 4—4 of Fig. 1; Fig. 5 is a detail of the preferred means for attaching the device to the forward vehicle.

Like characters of reference refer to like parts throughout the several views.

Referring to the accompanying drawings which illustrate our invention, A indicates the forward vehicle; B the rear vehicle which is to be towed; C the axle of that vehicle; and D the steering rod of the rear vehicle.

The invention comprises a pull rod 15; means for attaching the pull rod to a towing vehicle; means for attaching the device to the forward axle of the towed vehicle; ball-and-socket mechanism pivotally securing the aforesaid mechanism to the pull rod 15; and means operatively connected with the pull rod for steering the rear vehicle. For the latter purpose an auxiliary device is employed as will hereafter be explained.

The means which we have devised for attaching the device to the forward axle of the towed vehicle permit of adjustment to axles of various sizes and shapes, and comprise opposite slotted axle clips 1 and 4 (which preferably have a leather lining—not illustrated), which are secured to the axle by bolt 5, plate 6 and nuts 7, as illustrated in Figs. 1, 2 and 3, like members being provided for either side, spaced apart, or in other words, on portions of the axle adjacent opposite wheels. A bottom axle plate 3 is affixed to and connects clips 1, as shown in Fig. 4.

The ball-and-socket mechanism for pivotally connecting the pull rod with the means for attachment to the towed vehicle comprises a ball member 8 having its upper portion affixed to plate 3; opposite socket members 10, an intermediate socket member 11, packing 12 between the socket members, and fastening members 24. Socket members 10 are provided with a grooved portion 2, as illustrated in Fig. 3, to permit of free pivotal movement relative to ball member 8. One of the socket members 10 is screwed or otherwise affixed to pull rod 15; and the opposite socket member has similarly affixed to it a member 13.

The pull rod 15 is provided with suitable means for its attachment to a towing vehicle, which preferably comprises a hook 25, block 26 having a groove 27 (preferably), and a lock nut 28. We may provide a suitable member 30 for hook 25 to engage with, or may provide clamp or other fastening device for securing the pull rod to the rear portion of the frame of the forward or towing vehicle. We provide means operatively connected with pull rod 15 for automatically steering the rear vehicle, comprising a suitable slotted guiding member, which may be either member 13, having a slot 14, as illustrated in Fig. 2, or a member 16 having a slotted portion 17, this device being longitudinally adjustable on pull rod 15 by means of nut 9, as indicated in Fig. 2, and means connected with the steering rod of the towed vehicle engaging in the slotted guiding member. The latter means comprises, preferably, opposite slotted steering rod clips 19 and 20, adjustably fastened to the steering rod by means of bolt 23, plate 21 and nuts 22. A depending member 18, formed on or affixed rigidly to clip 19 extends either through slot 14 of member 13, when used with a vehicle of the type shown in Fig. 1, or with the slot in member 17, when the vehicle is of the type having the steering rod disposed forward of the front axle, as is contemplated by Figs. 2 and 3. The pull rod 15, which we prefer to employ is bent as indicated in the drawings, and is of relatively short length—about six feet—so that there is no loss of power as is the case where cables are employed. The cars are maintained in close proximity.

In operation, the clips 1 and 4 are secured to the front axle of the vehicle to be towed in the manner shown in the accompanying illustrations (which it should be noted permit of adjustment to any size or shape of axle, by reason of the slots in the clips and plate 6); depending member or rod 18 is inserted through the slot 14 in member 13—if the towed automobile has its steering rod in the rear of its front axle—or through slotted member 17—if the towed automobile has its steering rod forward of its front axle; pull rod is secured to the forward vehicle in the preferred manner and the rear vehicle may be towed and automatically guided by my device, pivotal movement of the pull rod sidewise actuating the guiding member (member 14 or member 16 as the case may be) which in turn actuates depending member 18 and thus moves the steering rod to which it is rigidly secured by clips 19 and 20 and plate 21, as illustrated. The ball and socket mechanism permits of pivotal movement either laterally or vertically, as will be obvious, and dispenses with the necessity for the more cumbersome, more expensive and less efficient universal joints, which might otherwise be necessary. It may be taken apart by removing fastening members 24, as is apparent from an inspection of Fig. 3. Efficient lubrication is provided by packing 12.

It is within the contemplation of our invention to use any suitable means for securing the pull rod to the forward vehicle, it being, however, attached to the rear frame of the forward vehicle (or optionally to both springs) and not to the axle of the front car, which is liable to injury from strain. We prefer to employ the attaching means shown in Fig. 5, as being the most advantageous and effective.

What we claim is:

1. The combination of a pull rod; means for attaching the pull rod to a towing vehicle; ball-and-socket mechanism for pivotally connecting the pull rod with the rear vehicle; means for attaching the aforesaid ball-and-socket mechanism to the forward axle of the rear or towed vehicle; a rearwardly-disposed slotted guiding member affixed to the aforesaid mechanism; and a slotted guiding member adjustably attached to the pull rod for adjustment to vehicles having differing relative arrangements of steering rods and front axles; and means attached to the steering rod, including a depending element engageable with either of the aforesaid slotted guiding members independently.

2. The combination of a pull rod; having a hook at its forward end for attaching it to the rear frame of a forward vehicle; means for locking the aforesaid hook firmly to the forward vehicle; ball-and-socket mechanism pivotally connecting the pull rod with a plate member; means, including a plate member and opposite slotted clips, adjustably secured to the forward axle of the rear vehicle for operatively connecting the ball-and-socket mechanism therewith; and means operatively connecting the pull rod and steering rod of the rear vehicle for automatically guiding that vehicle.

3. The combination of a pull rod; means for attaching the pull rod to a towing vehicle; ball-and-socket mechanism pivotally connecting the pull rod with the rear vehicle; opposite, adjustable slotted clip and plate members and fastening means therefor for adjustably attaching the device to forward axle of a rear or towed vehicle to which the ball and socket mechanism is operatively connected; similar adjustable, slotted clip and plate members, including a depending member, adjustably secured to a steering rod of the rear vehicle; and a guiding member attached to the pull rod and engageable therewith, substantially as described.

4. The combination of a pull rod; means for its attachment to a towing vehicle; ball and socket mechanism pivotally connecting the pull rod with the rear vehicle and including a depending ball member, a plurality of socket members, packing intermediately disposed between the socket members, and fastening means; adjustable slotted clips for attaching the aforesaid ball-and-socket mechanism to the forward axle of any towed vehicle; one or more slotted guiding members operatively connected with or attached to the pull rod; and means, including adjustable slotted clips, for operatively connecting the guiding member with the steering rod of any rear vehicle, substantially as set forth.

In witness whereof we have hereto affixed our signatures in the presence of two witnesses.

DONALD V. EICHIN.
EDWARD F. ZIMMERLY.
AARON H. ZIMMERLY.

Witnesses:
R. F. POWERS,
HENRY STERCHI.